United States Patent [19]
Long

[11] Patent Number: 5,370,482
[45] Date of Patent: Dec. 6, 1994

[54] CARGO SECUREMENT SYSTEM

[76] Inventor: Thomas G. Long, 13 Fairhaven Rd., Havertown, Pa. 19083

[21] Appl. No.: 112,937

[22] Filed: Aug. 30, 1993

Related U.S. Application Data

[63] Continuation of Ser. No. 870,901, Apr. 20, 1992, abandoned.

[51] Int. Cl.⁵ ............................................. G61D 45/00
[52] U.S. Cl. ................................... 410/153; 410/141; 410/152
[58] Field of Search ............... 410/104, 105, 129, 130, 410/132, 140, 142–144, 146, 149, 122–124, 126–127, 150–154, 148–149, 32, 96–100

[56] References Cited

U.S. PATENT DOCUMENTS

| | | | |
|---|---|---|---|
| 3,367,286 | 2/1968 | Jantzen | 105/369 |
| 4,982,922 | 1/1991 | Krause | 248/222.2 |
| 5,028,184 | 7/1991 | Krause | 410/143 |

Primary Examiner—David A. Bucci
Assistant Examiner—Gregory A. Morse
Attorney, Agent, or Firm—Reuben Wolk

[57] ABSTRACT

A securement system for cargo containers comprising a plurality of structural members adapted for mounting within the container, such as a truck trailer, a railroad boxcar, or a portable container, to cooperate with support members such as beams, to secure the cargo within the container. The structural members may be mounted on the walls of the container, using auxiliary locking devices, or may be free-standing adjacent to the cargo. The structural members have components including recesses or openings adapted to be interengaged with a plurality of the support members which extend transversely or longitudinally of the container in order to hold the cargo in place. The structural members preferably extend vertically within the container.

17 Claims, 3 Drawing Sheets

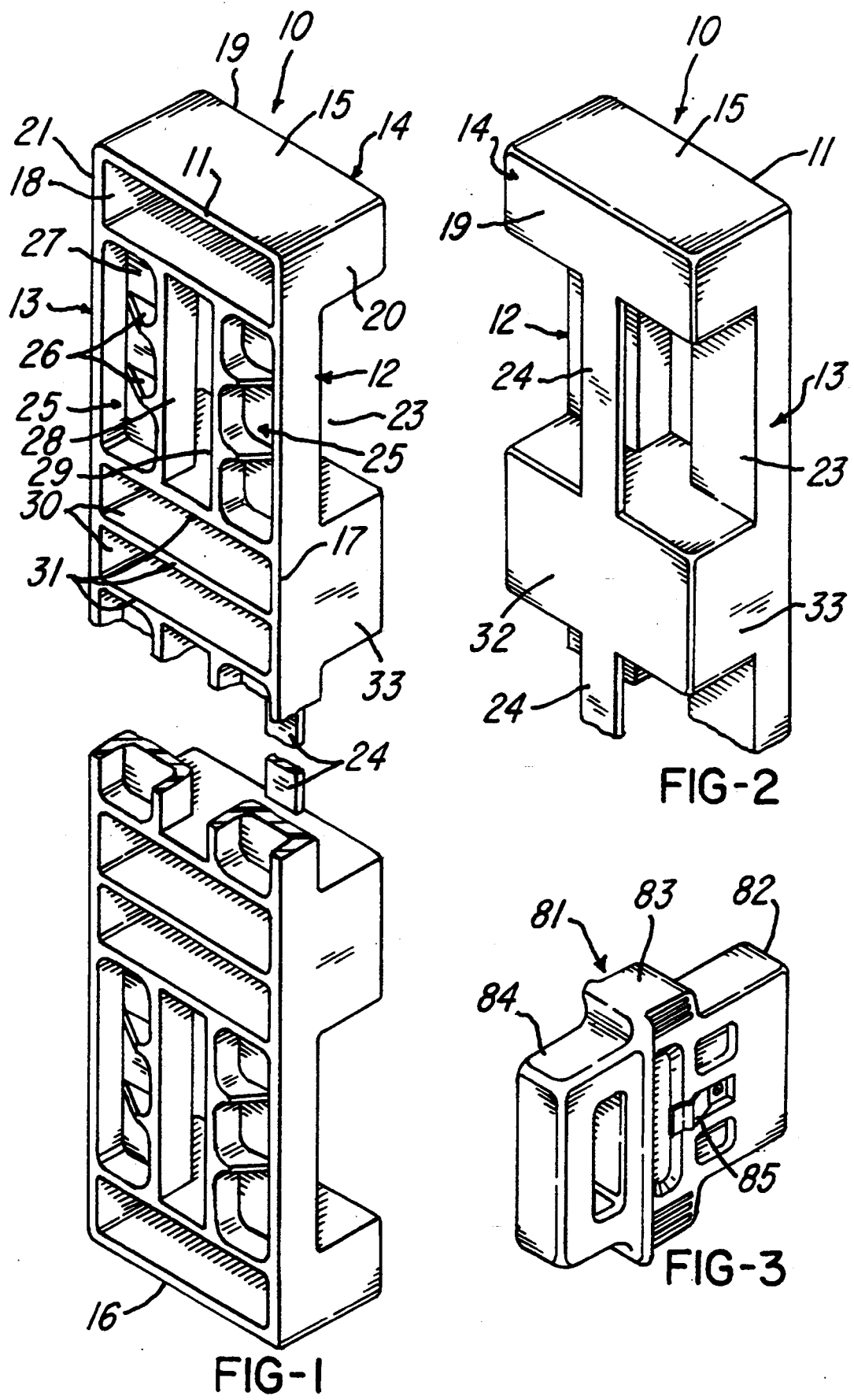

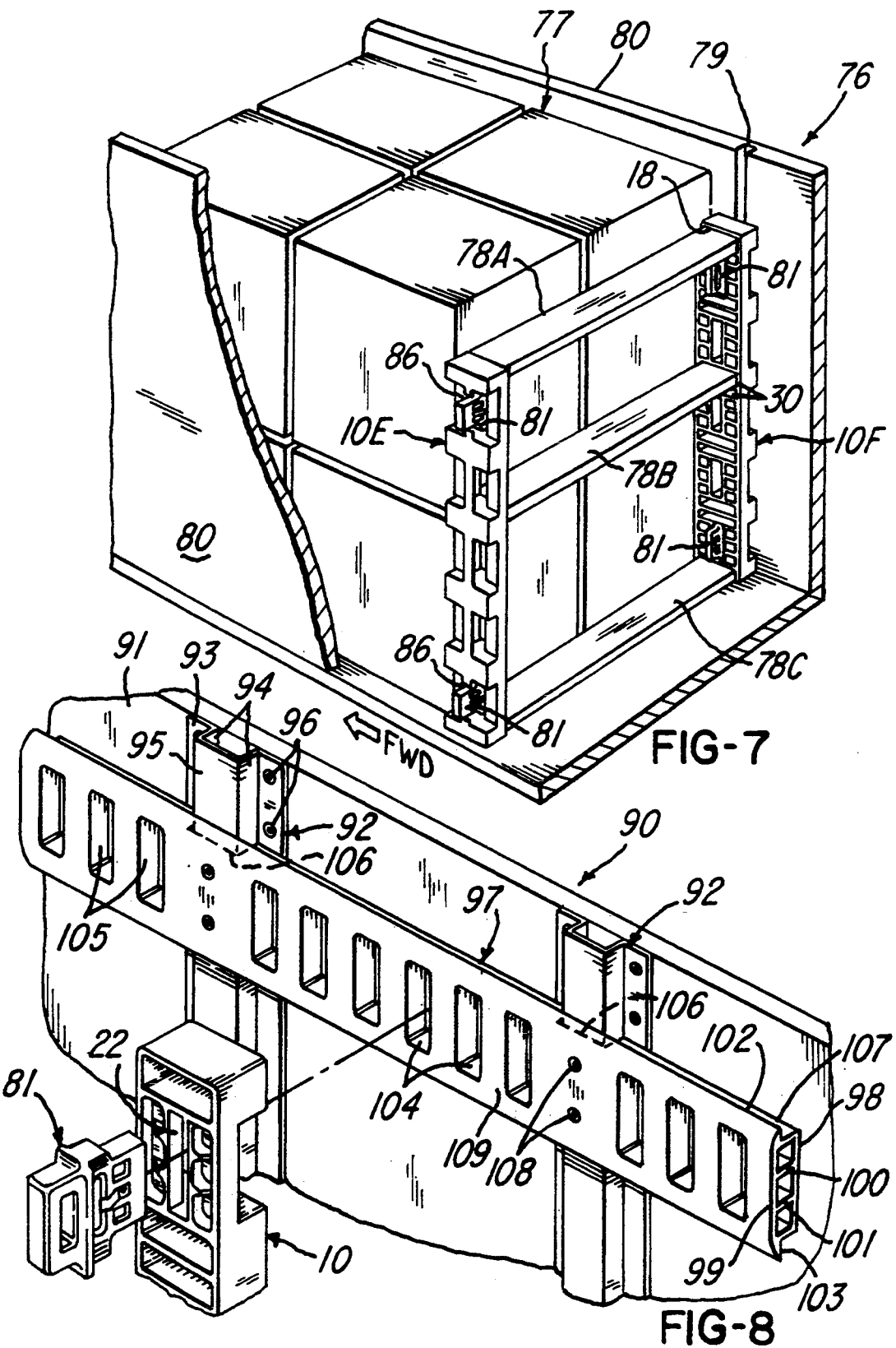

CARGO SECUREMENT SYSTEM

This is a continuation of application Ser. No. 07/970,901, filed Apr. 20, 1992, now abandoned.

BACKGROUND OF THE INVENTION

The present invention relates to a securement system for a cargo container, primarily consisting of structural members. These members are secured within the container, such as by standing them on the floor adjacent cargo packaging, against the cargo doors, attaching to the interior wall of a truck trailer, a railroad car, or a portable container using an auxiliary locking device. The members have recesses and openings therein, and a series of support members, such as wooden beams:or metal tubing, are placed into the recesses or through the openings to secure the cargo, these support members extending either transversely or longitudinally of the container.

PRIOR ART STATEMENT

Load control or securement systems have been provided by mounting tracks along the side of a railroad boxcar or truck trailer, and utilizing various forms of locking plates or brackets which are locked into the tracks. Locking beams are then secured to the brackets for holding the loads. Such a design is shown in U.S. Pat. No. 3,367,286 issued to Jantzen and in U.S. Pat. Nos. 4,982,922 and 5,028,184, issued to Krause.

SUMMARY OF THE INVENTION

The present invention provides for a novel structural member which cooperates with support members to form a system for securing cargo in a container, such as a truck trailer, a railroad box car, or a portable container. This is accomplished by providing elongated structural members which may be secured to the wall of the container, or to the cargo itself, without requiring special tracks or brackets as in the prior art. The members have integral aligned components comprising recesses and may also have reinforcing sections. The recesses are adapted to receive the ends of support members which thus cooperate with the structural members to secure the cargo in place during transit, thus preventing the cargo from shifting during sharp turns or sudden starts and stops of the vehicle which conveys the cargo.

The structural members may be mounted vertically or horizontally along the wall of the container and secured thereto by special locking devices, and the support beams inserted into the recesses in the structural members to cooperate with the structural members to form transverse or longitudinal means which contact and retain the cargo. This provides great versatility in securing any type of cargo, such as serving as an end gate if the container is full, or placement between split portions of the cargo. The recesses are preferably rectangular in cross-section to accommodate standard wooden beams, but may also be square or round to accomodate other sizes of standard wooden beams or metal tubing or rods.

The present invention is designed to overcome serious problems encountered by shippers, wherein freight is often received in a damaged condition because of improper securement, The novel system is fast and simple to install, adapts to special cargo configurations, eliminates the need for wasteful and cumbersome fillers, and its components can be re-used an indefinite number of times, The structural members are generally in the form of a parallelepiped made of a strong, lightweight material which can withstand repeated impacts from tools or heavy cargo without sustaining damage, and are so durable that they have a very long life. The members lend themselves to simple assembly against the cargo, or to the container walls using locking devices, and the support members or beams which retain the cargo are easily assembled to them.

The novel system offers distinct advantages over conventional systems in present use, such as wooden nailing strips, plastic strips adhered to container walls, or specially designed locking bars. Compared to such conventional systems:

There is no system failure which may damage the cargo.
No special installation tools are required.
The labor requirements are minimal.
No fillers are required.
The components are re-usable.
There is no damage to components during installation.
There is no damage to the walls of the container.

Accordingly, it is a principal object of the invention to provide structural members to secure cargo within a container, without requiring additional brackets or clips.

It is a further object to utilize said structural members in cooperation with support members to provide a novel cargo securement system within the container which minimizes shifting of the cargo.

It is a further object to provide means for securing said structural members to the walls of the container.

It is another object to provide means for securing said structural members to support members placed against the cargo.

It is still another object to provide recesses in the structural members to interlock said support members with said recesses.

It is a further object to inter-relate the structural members and support members into various combinations required to secure any type of cargo.

It is another object to provide a re-usable securement system which is fast and simple to install and is adapted to special load configurations.

It is yet another object to provide a system which will eliminate extraneous filler material.

These and other objects, features and details of the invention will become apparent from the embodiments presented in the following specification, drawings and claims.

DESCRIPTION OF THE DRAWINGS

FIG. 1 is a perspective view of the novel structural member.

FIG. 2 is a perspective view of the reverse side of the member of FIG. 1.

FIG. 3 is a perspective view of the locking device used to secure the structural member to the wall.

FIGS. 7 and 8 are perspective views of other typical systems.

DESCRIPTION OF THE PREFERRED EMBODIMENTS

Figures 4, 5:
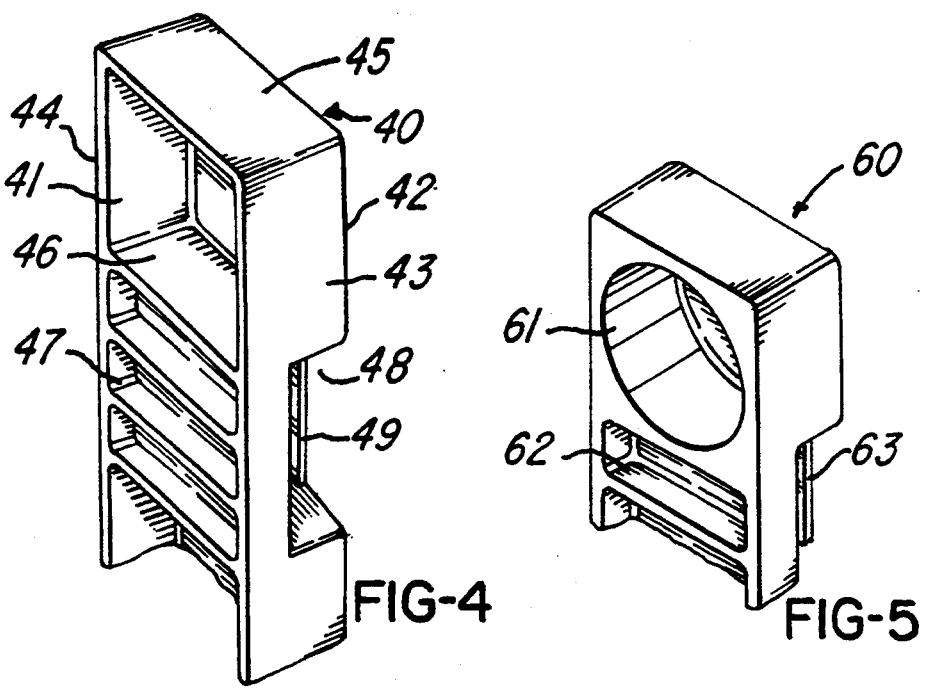
FIGS. 4 and 5 are fragmentary perspective views of modified forms of the member of FIG. 1.

Referring to the drawings, FIGS. 1 and 2 illustrate the novel structural member 10, sometimes referred to as a securement spacer bar, a securement spacer, or a securement system brace. The member 10 is generally in the form of a parallelepiped, and is preferably made of a strong, lightweight high impact thermosetting plastic, a preferred form of material being a poly-dicyclo pentadiene. However, other materials may be used. The member may be made of any desirable length, although for convenience in use it may be about four feet in length. The member is defined by a front face 11, side faces 12 and 13, a rear face 14, top face 15 and bottom face 16. The front face 11 has various components defined by a wall 17 which extends around the edge thereof. Among these components are single rectangular recesses 18 located adjacent the top and bottom faces, with the greater dimension extending horizontally across the entire width of the front face at right angles to the vertical extent of the member. These recesses are each enclosed at the rear face 14 by a wall segment 19 which forms part of the rear face; wall segments 20 and 21 which form part of the side faces 12 and 13; lateral wall 31 which which extends extends across the entire width of the front face 11 and to the wall segment 19 of the rear face and between the side faces; and by top face 15 or bottom face 16, which also function as lateral walls. Thus the referenced segments and lateral walls form a pocket defining each recess.

Extending away from the top and bottom faces, immediately adjacent the recesses 18, are rectangular recesses 22 which have their greater dimension extending vertically at right angles to the greater dimension of recesses 18, therefore parallel to the longitudinal extent of the member 10. These recesses, unlike the recesses 18, are not enclosed to form a pocket, but are open to the rear and side faces by virtue of the cutout or cutaway areas 23 in the sides; however, a longitudinally extending vertical strip 24 in the center of the rear face is aligned with the recesses. As best shown in FIG. 2, recesses or openings are thus formed on the; rear face by cutout areas in the side faces which are offset in a vertical direction from the recesses 18, so that these openings 23 are also defined by the sides and defined by the rear strip 24. On each side of each recess 22 is a generally rectangular vertically extending reinforcing section 25, consisting of alternating ribs 26 and depressions 27, these sections being located adjacent: the wall 17 and defined by segments of the wall, and walls 28 and 29 which also define the recesses 22 centrally located between the reinforcing sections. Thus the sections 25 and the recess 22 each have smaller demensions totalling the greater demension of recesses 18, and also cumulatively comprise the entire width of the front face.

A series of four dual recesses 30 extend along the width of the front face, these recesses, like recesses 18, having their greater dimension in a horizontal direction. Each recess is are separated by a lateral wall 31 to form separate recesses, each identical to recesses 18, and similarly enclosed by rear wall segments 32 and side wall segments 33. Thus the segments 32 and 33 and walls 31 form pockets defining the separate vertically aligned recesses 30, this group of recesses being offset in a vertical direction from the cutout areas. These dual recesses are separated by three additional groups of recesses 22 and reinforcing sections 25 identical to those previously described, and having similar cutout areas 23 and aligned portions of strip 24. The strip 24 therefore extends along the entire rear face of member 10. It should be understood that any number of recesses may constitute this group, such as three, four or more, as desired.

Thus, the member 10, which is generally in the shape of a parallelepiped, comprises a series of rectangular recesses in the front face, the larger demensions of the recesses alternately horizontally and vertically oriented to provide versatility. In addition, there are recesses or openings formed in the rear face by the cutouts 23 and the strip 24. The structural members are utilized in combination with each other and with support beams in the manner described below in order to secure the cargo. The configuration of member 10 is merely illustrative, and could be designed with other combinations of horizontally and vertically oriented recesses.

MODIFICATIONS

In the preferred form of the invention, the recesses 18, 22 and 30 are all about one and five-eighths inches by five and five-eighths inches in dimension to accomodate the ends of standard 2" by 6" beams. Similarly, the cutout areas are also sized to receive the same size beams. However, these recesses may also be designed to accomodate other standard beams, such as 2" by 4" or 2" by 8". Alternatively, the recesses may have other configurations; for example, FIG. 4 illustrates a structural member 40 similar to member 30 except that the recesses 41 are square, of a size to receive the end of a 4" by 4" beam. The recess is enclosed on all sides similar to recess 18 by utilizing the rear face 42, side faces 43 and 44, top face 45. and lateral wall 46. Adjacent the recess is a reinforcing section 47 formed with ribs and depressions similar to reinforcing section 25. The reinforcing section is defined by cutouts 48 on the sides and a segment of a strip 49 on the rear face, and is spaced from the front face at a distance which will allow a similar 4×4 beam to be inserted. The recesses 41 may also be of other dimensions to accept the ends of square beams having such other cross-sectional dimensions.

Another modification is illustrated in FIG. 5, wherein the structural member 60 is similar to member 40 except that it has circular recesses 61 designed to receive a tubular or cylindrical support member whose ends fit within these recesses. These recesses, like recesses 41, may alternate with reinforcing sections 62, spaced from a back strip 63 to provide openings for laterally inserted square or rectangular support members.

THE SECUREMENT SYSTEM

Figure 6:
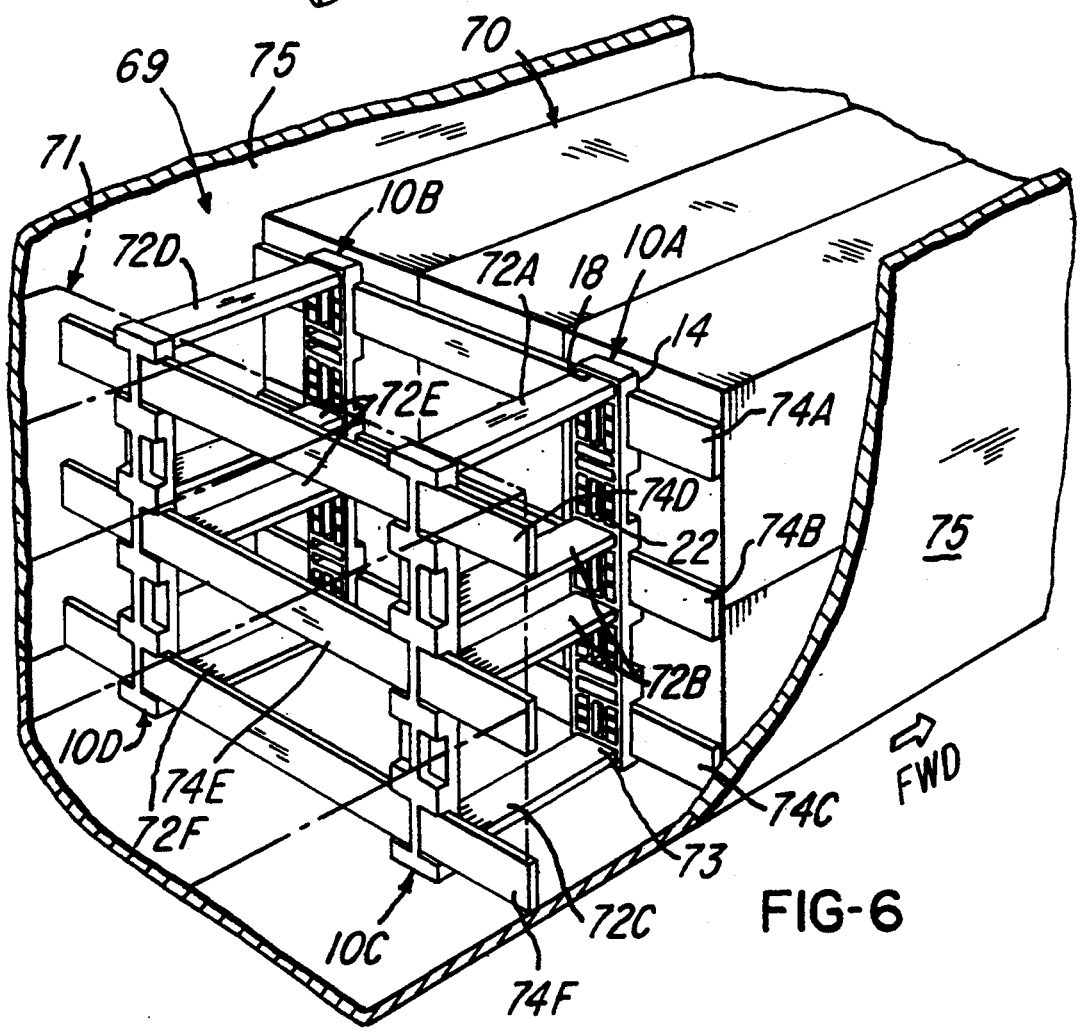
FIG. 6 is a perspective view illustrating a typical securement system.

Having described the preferred and modified forms of the structural members 10, 40 and 60, the following is a description of typical securement systems for cargo containers utilizing several of these members in combination with each other and with support members. Such systems are shown in, FIGS. 6 and 7 utilizing the preferred form of members 10, but members 40 or 60, as well as other modifications of these, may be used to form the system. FIG. 6 shows a system 69, the purpose being to brace two separated sections of cargo, designated by reference numbers 70 and 71. The cargo usually consists of individual packages, rolls of goods, or loose items. The arrangement shown may be necessary if the cargo does not fill the entire container. The four members 10A, 10B, 10C and 10D stand vertically on the floor, and the rear faces 14 of members 10A and 10B are adjacent the forward cargo 70; while the members 10C and 10D are located further aft, also standing vertically on the floor, and the aft cargo 71 is placed against the rear faces 14 of these members. The system is completed by assembling a plurality of forwardly or longitudinally extending support members, such as 2×6 beams, designated by reference numbers 72A, 72B, 72C, 72D, 72E, and 72F; the ends 73 of these beams are inserted into the recesses 18, 22 or 30 of the structural members, in any desired configuration according to the size and weight of the cargo. In the exemplary mode of FIG. 6, the forwardly facing ends of beams 72A, 72B and 72C are inserted into the single recesses 18 of member 10A, and the aft ends of the same beams are inserted into similar recesses 18 of member 10C. Similarly, the forward ends of beams 72D, 72E and 72F are inserted into the recesses of member 10B, and the aft ends into the recesses of member 10D. As discussed above, the beams shown, or any additional similar ones, could have been inserted into one or both of the dual recesses 30, or could have been rotated at right angles to fit into vertically oriented recesses 22. This arrangement braces the cargo in a fore and aft direction.

In order to brace the structural members in a transverse direction, additional beams or support members are locked into the structural members by sliding them into the opening created by the cutouts 23 and retained by the rear strip 24. Thus, in the FIG. 6 example, beams 74A, 74B, and 74C are assembled at the rear face of members 10A and 10B and are placed practically adjacent the aft face of cargo 70 to accentuate the bracing effect. Similarly the beams 74D, 74E and 74F are assembled at the rear face of members 10C and 10D closely adjacent to the forward face of cargo 71 to improve the bracing effect. The transverse beams are longitudinally sized so that their ends contact the opposite sides of the container 75 to complete the securement system, and the aft container door (not shown) is usually closed against the aft end of the cargo.

It should be understood that some of the securement arrangements do not lend themselves to assembly within the container, but may require pre-assembly on the ground before lifting into place against the cargo. In either case, after the container reaches its destination, all of the structural members and beams can be readily disassembled in the reverse order for re-use in a similar arrangement or other arrangements.

Another typical securement system 76 is shown in FIG. 7, this system consisting of two structural members 10E and 10F standing vertically on the floor of the container compartment, and turned so that the side faces are in contact with a single cargo 77. Transversely extending beams 78A, 78B and 78C are inserted in the recesses 18 and 30 to provide transverse support for the cargo. In this system, the members 10E and 10F are locked into place by utilizing a plurality of locking devices 81 shown in FIG. 3, the device consists of a rectangular end 82, designed to fit into and through the vertically oriented recesses or openings 22 of the members 10, the end being long enough to fit into the apertures or slots 79 in the container wall 80 which are aligned with the recesses. Adjacent the end 82 is a body 83, attached to a handle 84 by which the device is gripped to insert it through the opening and into the slot. The device has compression means, such as a pair of flat springs 85, mounted on each side of the end. this provides a tight fit on the end into the opening and slot, yet permits the device to be easily removed by a pull on the handle. As shown in FIG. 7, segments of the strip 24 have been cut away to form openings 86 so that end 82 may be inserted into the slot 79. The end of the locking device may be sized to fit into recesses designed for 2×4, 2×6 or 2×8 beams. The structural members may be pre-assembled with the beams on the ground, lifted into the container, and locked in place by the locking devices. Disassembly is very simply done by a reverse procedure, and the components are ready for re-use.

FIG. 8 illustrates a different securement system 90, adapted to lock the structural members on the wall of the container when the container is the truck trailer or the boxcar itself, rather than a separate container wall. Such a system is similar to that of system 76 of FIG. 7 in which the members are locked to slots in the wall; in this system there are no slots and other means are utilized to accomplish the same result. Trailers and boxcars are usually made with an outer and an inner wall or skin; in this arrangement the inner wall is removed in selected areas to expose the vertically extending channel beams between the inner wall and the outer wall 91. A typical channel beam 92 has flat flanges 93, bent out side walls 94, and a front wall 95. The beam is normally mounted on the wall by mounting means such as rivets 95 which are passed through the flanges 93. The standard beams are spaced approximately two feet apart in a longitudinal direction.

Affixed to the beams are a plurality of horizontal mounting members in the form of strips 97, extending longitudinally of the container. Preferably, one of the strips is mounted near the roof, and the other near the floor, as shown, although other arrangements are possible. Although this strip may be made of a metal, it is preferable to mold it from a plastic material such as that used to make the structural members 10. The strip has a back wall 98 and a front wall 99, and is hollow except for reinforcing ribs 100 and 101 which extend longitudinally of the strip. The front wall 99 has an upper lip 102 and a lower lip 103. A series of slots 104 are molded through the walls 98 and 99, and have walls 105 to seal them off, thus interrupting the ribs 100 and 101. The slots are oriented vertically, and are the same dimension as slots 22 in the members 10. The slots are spaced along the strip in a longitudinal direction. The strip 97 is mounted on the beam by providing cutout portions 106 in top surface 107 so that the inner side of the front face bears against the front wall 95 of the beams, and are assembled thereto by the use of conventional fasteners 108, such as screws, The portions 109 are devoid of slots in order to provide proper contact.

The strips 97 are utilized in the following manner: structural members 10 are arranged so that the upper and lower vertical slots 22 are aligned with the selected slots 104 of the strip. Locking members 81 are inserted through the slots 22 into the selected slots 104 of the strip, thus securely locking the members 10 into place. If the members 10 are to be moved forward or aft to another location, the members 81 are pulled back out of the slots, allowing the members to removed to a new desired position, where they are locked into different slots 104. It should be understood that the strips are preferably made of relatively short lengths and that they may be mounted wherever needed. When the cargo is unloaded, it is a simple procedure to remove the locking members and the structural members with little effort.

The systems 69, 76 and 90 are merely illustrative of the many arrangements of components which are possible, all of which fall within the scope of the inventive concept.

I claim:

1. In a securement system comprising a cargo container for holding cargo having a floor and side walls, said container extending in a longitudinal direction and said side walls also extending in a longitudinal direction and being transversely opposite each other; the improvement comprising elongated structural members extending vertically from said floor, and rigid support members interengaged with said structural members, each of said structural members being generally in the form of a one piece longitudinally extending parallepiped having front, rear and side faces, a plurality of integral lateral walls extending to said rear face and between said side faces across approximately the entire width of said front face, said lateral walls and segments of said rear and side faces forming pockets defining separate vertically aligned like recesses, at least a first support member having an end inserted within a first respective recess for interengaging said structural members for bracing said cargo, said recesses having a cross-sectional shape in a plane parallel to said front face conforming to the cross-sectional shape of said support members, said rear face of each of said structural members comprising a vertically extending strip, said side faces having cutout areas offset vertically from said recesses, segments of said strip and said cutout areas defining openings, and at least a second of said support members inserted within a respective opening for additional bracing of said cargo.

2. The securement system of claim 1 wherein some of said support members extend transversely between said walls.

3. The securement system of claim 1 wherein some of said support members extend longitudinally of said container.

4. The securement system of claim 1 wherein some of said support members extend transversely between said walls, and others of said support members extend longitudinally of said container.

5. The securement system of claim 1 wherein said structural members are adjacent said cargo.

6. The securement system of claim 1 comprising means associated with said container walls for securing said structural members, said securement system further comprising locking means, said locking means being inserted through said structural members into said securing means to lock said structural members to said walls.

7. The securement system of claim 6 wherein said securing means comprise mounting members on said walls, said mounting members having recesses therein, said locking means being inserted through selected ones of said recesses of said structural members into aligned recesses in said mounting members to lock said structural members into said mounting members.

8. The securement system of claim 7 wherein said recesses in said mounting members are rectangular and vertically extending, and have their greater dimension parallel to the longitudinal extent of said structural members, said selected ones of said recesses also being rectangular and vertically extending.

9. The securement system of claim 6 wherein said securing means comprise vertical slots in said walls, said selected ones of said recesses in said structural members being rectangular and having their greater dimension parallel to the longitudinal extent of said structural members and to said slots, said locking means being inserted through selected ones of said recesses in said structural members into said slots to lock said structural members into said walls.

10. In a securement system comprising a cargo container for holding cargo having a floor and side walls, said container extending in a longitudinal direction and said side walls also extending in a longitudinal direction and being transversely opposite each other, said system including support members; the improvement comprising elongated structural members extending vertically from said floor, each of said structural members being generally in the form of a one piece longitudinally extending parallelepiped having front, rear and side faces, a plurality of integral lateral walls extending to said rear face and between said side faces across approximately the entire width of said front face, said lateral walls and segments of said rear and side faces forming pockets defining vertically aligned like recesses, said recesses adapted to interengage with the ends of support members and having a cross-sectional shape in a plane parallel to said front face adapted to conform to the cross-sectional face of said support members, each of said structural members further comprising a vertically extending strip on said rear face, said side faces having cutout areas offset vertically from said recesses, segments of said strip and said cutout areas defining openings adapted to receive respective ones of said support members.

11. The structural member of claim 10 wherein said cross-sectional shape is square.

12. The structural member of claim 10 wherein said cross-sectional shape is circular.

13. The structral member of claim 10 wherein said cross-sectional shape is rectangular.

14. The structural member of claim 13 wherein said recesses have their greater dimension extending at right angles to the longitudinal extent of said structural member, and said structural member also having vertically extending recesses which have their greater dimension extending parallel to the longitudinal extent of said structural member.

15. The structural member of claim 14 wherein at least two of said horizontally extending recesses are adjacent each other and are separated only by a lateral wall.

16. The structural member of claim 14 wherein each of said vertically extending recesses is immediately adjacent one of said horizontally extending recesses.

17. The structural member of claim 14 wherein said horizontally extending recesses have a greater dimension approximately equal to the width of said structural member.

* * * * *